United States Patent [19]

Matsumoto

[11] Patent Number: 4,470,661
[45] Date of Patent: Sep. 11, 1984

[54] BEAM DEFLECTING DEVICE

[75] Inventor: Kazuya Matsumoto, Yokohama, Japan

[73] Assignee: Canon Kabushiki Kaisha, Tokyo, Japan

[21] Appl. No.: 509,862

[22] Filed: Jun. 30, 1983

Related U.S. Application Data

[63] Continuation of Ser. No. 256,159, Apr. 21, 1981, abandoned.

[30] Foreign Application Priority Data

Apr. 26, 1980 [JP] Japan .................................. 56-56080
Apr. 26, 1980 [JP] Japan .................................. 56-56082

[51] Int. Cl.³ ............................................ G02B 5/174
[52] U.S. Cl. .................................. 350/96.13; 350/358
[58] Field of Search ............... 350/96.13, 96.14, 96.19, 350/162.24, 358

[56] References Cited

U.S. PATENT DOCUMENTS

| | | | |
|---|---|---|---|
| 3,655,261 | 4/1972 | Chang | 350/96.13 |
| 3,906,393 | 9/1975 | Fletcher et al. | 350/96.13 X |
| 4,295,145 | 10/1981 | Latta | 350/358 X |
| 4,321,564 | 3/1982 | Tregay | 350/358 X |

OTHER PUBLICATIONS

Tsai et al., "High-Performance Acousto-Optic Guided-Light-Beam Device Using . . . ", *Appl. Phys. Lett.*, vol. 26, No. 4, Feb. 1975, pp. 140-142.
Tsai et al., "Wide-Band Guided-Wave Acoustooptic Bragg Diffraction . . . ", *Proc. of IEEE*, vol. 64, No. 3, Mar. 1976, pp. 318-328.
Nguyen et al., "Efficient Wideband Guided-Wave Acoustooptic Bragg Diffraction . . . ", *Appl. Optics*, vol. 16, No. 5, May 1977, pp. 1297-1304.
Lee et al., "An Acoustooptic Readout Scheme for . . . ", *1978 Ultrasonics Symposium Proceedings*, Cherry Hill, N.J., Sep. 1978, pp. 79-81.

*Primary Examiner*—John D. Lee
*Attorney, Agent, or Firm*—Fitzpatrick, Cella, Harper & Scinto

[57] ABSTRACT

Beam deflecting device constructed with an optical waveguide, a pair of transducers for generating acoustic waves in the waveguide, a device for intersecting a first and a second light beam with acoustic waves from mutually different directions and for diffracting the light beams, a driving device for driving the transducers, and a device for effecting change-over between the first light beam and the second light beam.

7 Claims, 36 Drawing Figures

BEAM DEFLECTING DEVICE

This application is a continuation of application Ser. No. 256,159 filed Apr. 21, 1981, now abandoned.

BACKGROUND OF THE INVENTION

1. Field of the Invention

This invention relates to a light beam deflecting device utilizing a supersonic wave.

The supersonic wave deflector (hereinafter referred to as "A/O deflector") is capable of performing high speed scanning in comparison with heretofore known mechanical deflectors such as a rotational polygonal mirror, a galvano-mirror, and so forth. On account of this, the A/O deflector has been expected for its use in various fields such as a high speed laser beam printer, a TV display device, and so on.

2. Description of the Prior Art

The A/O deflector is classified into two types, i.e., a volume type deflector as shown in FIG. 1 of the accompanying drawing, and a thin film optical waveguide type deflector as shown in FIG. 2. The present invention is applicable to both types.

In the following, the construction and function of these A/O deflectors will be explained. The volume type deflector shown in FIG. 1 is constructed with a supersonic wave transducer 1 composed of a piezoelectric substance such as PLZT, etc. This transducer 1 is adhesively disposed on a supersonic waveguide member such $TeO_2$, etc. When a high frequency voltage in a frequency band ranging from 50 MHz to 1,000 MHz is applied from outside to this transducer 1, the supersonic wave propagates through the waveguide member 2 in the form of compression waves, whereby a diffraction lattice structure is formed in the waveguide member due to variations in the refractive index. When a laser beam 3 is introduced into this waveguide member 2, it is subjected to the Bragg's diffraction by the abovementioned diffraction lattice structure and is projected out as a diffracted light beam 4. In this case, an angle of diffraction $\theta$ formed by a zero order diffracted light beam 5 and the diffracted light beam 4 as projected out fluctuates in accordance with the frequency of the high frequency wave to be applied to the transducer 1, which is given by the following equation:

$$\theta = \sin^{-1}\left(\frac{\lambda f}{2Vn}\right) \quad (1)$$

(where: V is a speed of the supersonic wave; f is an applied frequency; $\lambda$ is a wavelength of the incident light beam in the air; and n is a refractive index of the waveguide member (or medium) 2).

From the above equation, it will be understood that, by varying the frequency f of the applying signal, the angle of diffraction $\theta$ can be varied and the projecting light beam 4 can be deflected and scanned. The maximum deflection in this deflecting angle is governed by selection of an angular range for the Bragg's diffraction. That is to say, when the frequency of the high frequency wave exceeds a certain definite frequency value, the incident light beam comes out of the coupling condition for the diffractive lattice structure resulting from a supersonic wave field, and the diffracting efficiency lowers. On account of this, the maximum deflecting angle (a scannable angular range) is limited, which is 3 degrees or so at most in the conventional device.

FIG. 2 illustrates the thin film waveguide type A/O deflector. An optical waveguide 7 is formed by diffusing titanium on the surface of a piezoelectric crystal substrate 6 such as $LiNbO_3$, etc. The optical waveguide has a thickness of approximately 2 micro-meters or so, and constitutes a high refractive index layer with its refractive index being higher by approximately 0.01 than the refractive index of the $LiNbO_3$ substrate (R.I. of 2.2).

By moving a prism 8 of a high refractive index near to this optical waveguide 7, a laser beam 9 is introduced into the waveguide 7 from outside. A comb-shaped electrode 10 for supersonic wave excitation is provided on the surface of the optical waveguide 7. By application of a high frequency wave to this electrode 10, a supersonic surface wave is generated on the surface of the substrate 6. A light beam 11 projected into the optical waveguide 7 is diffracted by this supersonic surface wave as a deflected light beam 12. As in the case with the volume-type A/O deflector, the light beam 12 is deflected by varying the frequency of the high frequency wave to be applied to the electrode 10. The deflected light beam 12 is projected outside by a projecting prism 13, and used as the deflected light beam. With this optical waveguide type A/O deflector, too, the maximum deflection is limited by the coupling conditions for the Bragg's diffraction.

In the field of the optical waveguide type A/O deflector, there have been several attempts made to increase the angle of deflection. One example is mentioned in detail in the following publication: IEEE Transactions on Circuit and Systems, Vol. CAS-26, No. 12, p 1072, "Guided-Wave Acousto-Optic Bragg Modulations for Wide-Band Integrated Optic Communications and Signal Processing" by C. S. Tsai. One of the actual examples is as shown in FIG. 3, wherein the deflector is so constructed that a wide frequency band is shared by a plurality of transducers $14_1$, $14_2$, ..., each having a different resonant band, and that, by slightly tilting the transducers one after the other, the incident light beam may be coupled in the entire frequency band. In the illustrated example where four transducers are used, a frequency band of 680 MHz is obtained. In this case, the angle of deflection is approximately 4 degrees.

The other example is as shown in FIG. 4, wherein the device is so constructed that a pitch P and a inclination $\phi$ of each tooth of a comb-shaped electrode 15 are sequentially varied to change the travelling direction of the supersonic wave as it proceeds from a low frequency range to a high frequency range, thereby coupling the incident light beam in a wide frequency band.

Even in these improved deflectors, the maximum angle of deflection remains 4 degrees or so due to various restrictions imposed on its manufacture such as a driver technique, pattern working technique for the comb-shaped electrode, and so forth.

While this method of increasing the angle of deflection necessitates a voltage applying oscillator of a wide frequency band with increase in the angle of deflection, it is generally hard to obtain such an oscillator. As one way of widening the angle of deflection without broadening the frequency band, there may be contemplated a method, wherein, as shown in FIG. 5, a plurality of transducers, each having the same frequency band, are disposed with their angle of inclination being varied, and the directions of the incident light beams are also varied corresponding to the angle of inclination of each transducer so that the combinations between the incident light beams and the transducers may be sequentially changed over. An advantage to be derived from this method is that the frequency in the supersonic transducer does not become extremely high. A problem with this method, on the other hand, is the influence of the zero order diffracted light which exists in this kind of deflector.

In more detail, as in FIG. 5, when the first light beam 18 is projected to the supersonic wave 17 excited by the first transducer 16, a part of the light beam is deflected, while the other part becomes the zero order light 19 without being diffracted. By this first transducer 16, an angular range 21 (as diagonally shaded) between the maximum diffraction angle 20 and the minimum diffraction angle 24 is scanned. Then, by combination of the second transducer 22 changed over time-sequentially from the first transducer 16 and the incident light beam 23, a deflecting range 25 (as diagonally shaded) between the maximum diffraction angle 24 and the minimum diffraction angle 26, which is contiguous to the first delecting range 21, is scanned. In this deflecting range 25, the zero order light beam 19 derived from the abovementioned first light beam 18 is present. On account of this, when this deflector is used for the laser beam recording or the laser beam display, this zero order light beam 19 constitutes a stationary light beam with respect to the deflected light beam, so that, even when the light quantity is rather small, it remains a bright line noise in the deflecting ranges 21, 25, which is very harmful to the recording or the display.

In the following, explanations will be given as to the fly-back time of the deflected light beam. Conventionally, when the light beam scanning is to be conducted using the A/O deflector, an incident light beam is repetitively deflected and scanned from a position a to a position b as shown in FIG. 6A by introducing the so-called "chirped signal" which repeatedly changes from a low frequency $f_1$ to a high frequency $f_2$ as shown in FIG. 6B. In this case, the fly-back time required for the deflected beam to return from its maximum diffraction angle position b to its minimum diffraction angle position a is given by a time $\tau$, during which a supersonic wave of a speed V passes through a width W of the light beam ($\tau = W/V$). As one example, the time $\tau$ for the supersonic wave of a speed of $3.5 \times 10^6$ mm/sec. to cross the light beam of 6 mm in width is 1.7 microsecond, which fly-back time is problematically non-negligible in the high speed scanning. Accordingly, the fly-back time should desirably be zero.

SUMMARY OF THE INVENTION

It is an object of the present invention to provide a beam deflecting device capable of producing a deflected light beam with a wide angle of deflection without broadening a frequency band to be applied to a transducer.

It is another object of the present invention to provide a beam deflecting device capable of producing a deflected light beam of a wide angle of deflection, without containing an undesirable noise beam within the angular range.

It is still another object of the present invention to provide an A/O beam deflecting device, in which a fly-back time of the deflected beam is substantially zero.

It is another object of the present invention to provide a beam deflecting device which is capable of scanning a beam in a wide range, and in which the fly-back time of the deflected beam is substantially zero.

DESCRIPTION OF THE PREFERRED EMBODIMENTS

Figure 7:
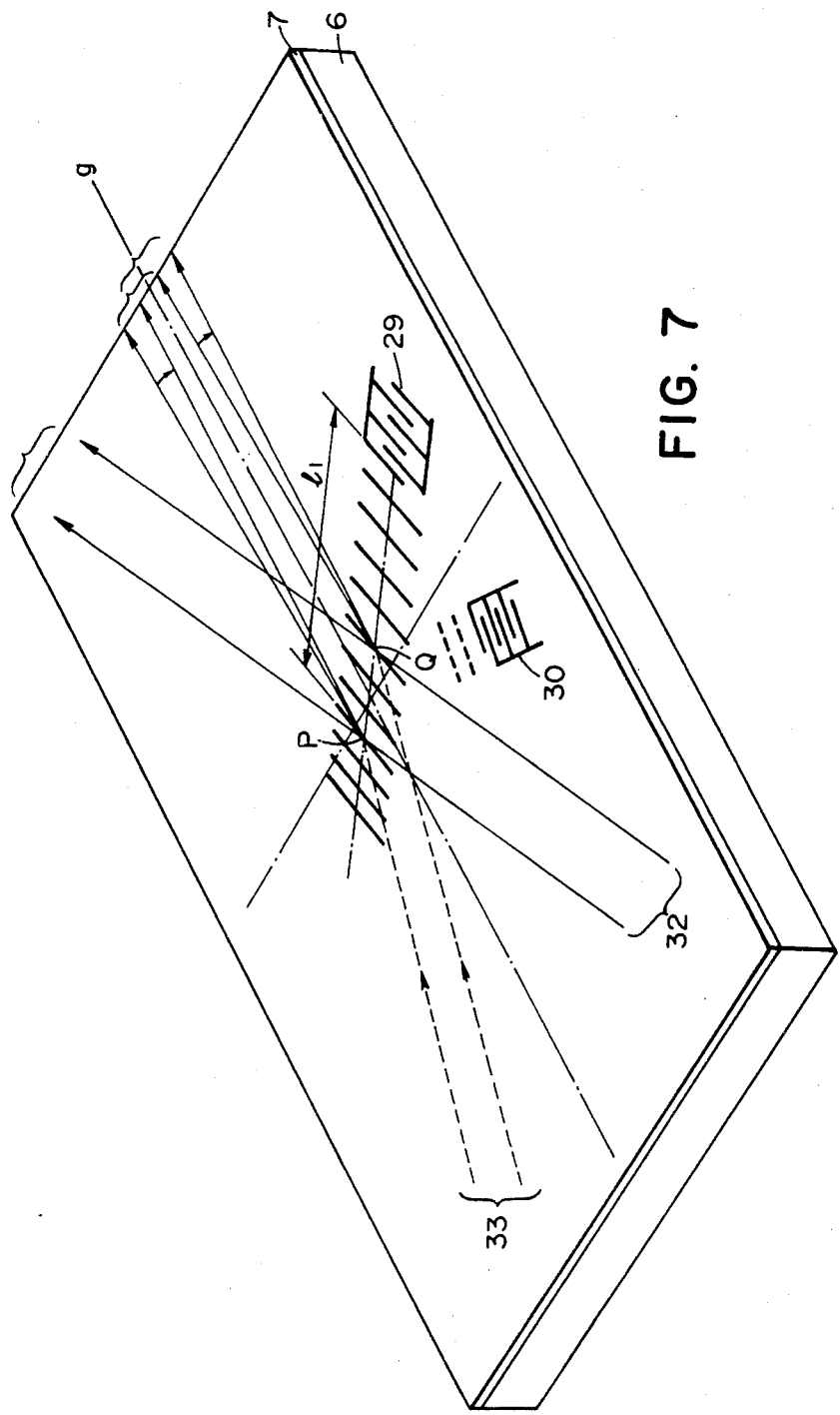
FIG. 7 is a perspective view showing the first embodiment of the beam deflecting device according to the present invention with an angle of deflection being widened.
Figure 8A:
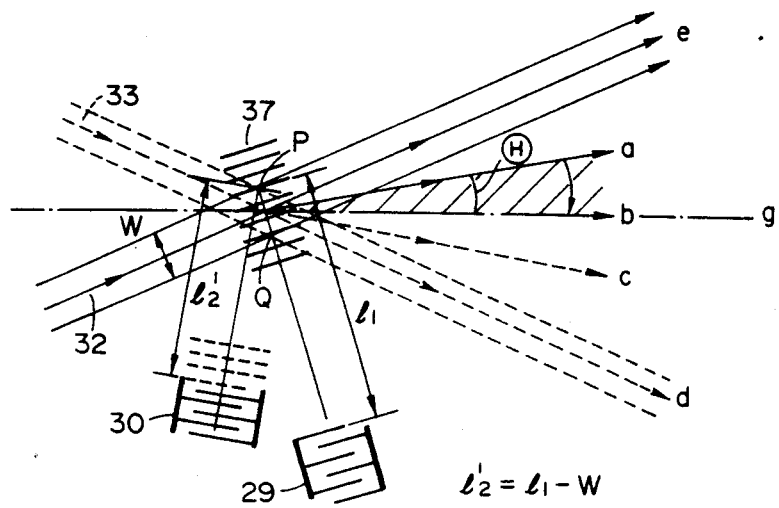
FIGS. 8A and 8B are plan views showing deflection of light beams in the beam deflecting device shown in FIG. 7.
Figure 8B:
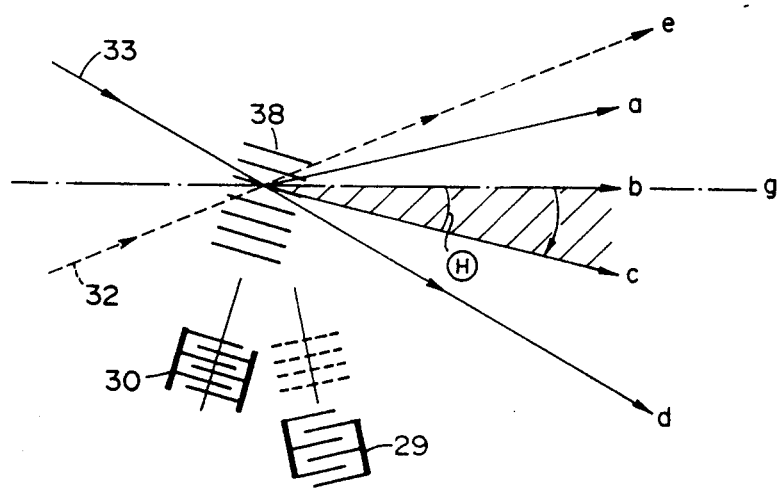

FIG. 7 illustrates the first embodiment of the beam deflecting device according to the present invention. This beam deflecting device is the optical waveguide type A/O deflecting device, wherein the optical waveguide 7 is formed by diffusing a metal such as titanium on the surface of a piezoelectric crystal plate 6 of $LiNb_3$ or like other materials, and comb-shaped electrodes 29, 30 are provided on the surface of the optical waveguide 7 at mutually angled positions. Partially enlarged plan views of this beam deflecting device are shown in FIGS. 8A, 8B. The electrode 30 as the second transducer is disposed at a position closer to the light beam than the electrode 29 as the first transducer by a width W of the light beam.

Figure 9:
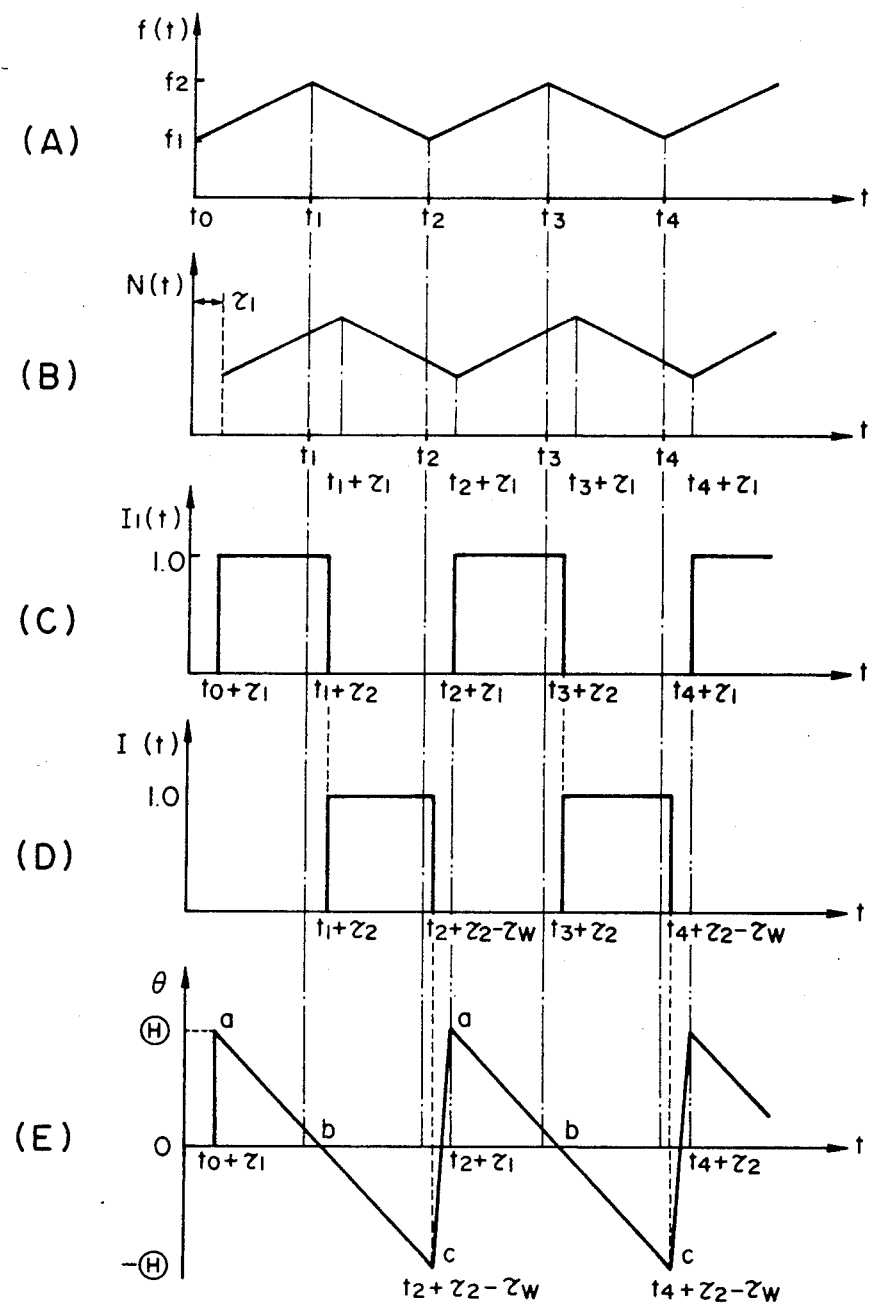
FIGS. 9A through 9E are diagrams showing changes in the frequency signal in the beam deflecting device of FIG. 7.

In this embodiment of the beam deflecting device, a voltage signal which reciprocally changes in a frequency range between frequency $f_1$ and frequency $f_2$, as shown in FIG. 9A, is alternately applied to the comb-shaped electrodes 29, 30. In other words, a signal with its frequency continuously changing from $f_1$ to $f_2$ in a time period of from $t_0$ to $t_1$ is applied to the first electrode 29, and a signal with its frequency continuously changing from $f_2$ to $f_1$ in a time period of from $t_1$ to $t_2$ is applied to the electrode 30. By application of these high frequency signals, a supersonic elastic surface wave is generated on the surface of the optical waveguide 7, which travels at a speed of V mm/sec.

During the initial time period of from $t_0$ to $t_1$ wherein the frequency of the signal changes from $f_1$ to $f_2$, the first light beam 32 having a width W is projected to a supersonic wave field of the elastic surface wave 37 on the optical waveguide, which has been generated from the first electrode 29 by this signal. This elastic surface wave reaches an end point P of this light beam distant by $l_1$ from the first electrode 29 and a point Q distant by $l_2 = l_1 - W$ therefrom with its respective time lags of $\tau_1 = (l_1/V)$ sec. and $\tau_2 = \tau_1 - \tau_W$ (where: $\tau_W = W/V$).

Now assume that the frequency of the voltage to be applied to the electrode 29 at a time instant t is denoted by $f(t)$. A diffraction lattice constant $N(t)$ (a reciprocal of the lattice interval, i.e., a reciprocal of the wavelength of the elastic wave) between the elastic surface waves at the point P is given by an equation:

$$N(t) = \frac{f(t - \tau_l)}{V},$$

and the frequency changes as shown in FIG. 9B. As the consequence, the first light beam 32 is deflected from the minimum diffraction angle position a to the maximum diffraction angle position b as shown in FIG. 8A during a time period of from $(t_0 + \tau_1)$ to $(t_1 + \tau_2)$ so as to be away from the zero order light position e. When the angle of diffraction measured from a reference position g shown in FIG. 8A is assumed to be $\theta$, the first light beam is deflected from an angle of diffraction H degree to zero degree during the abovementioned time period.

Figure 5:
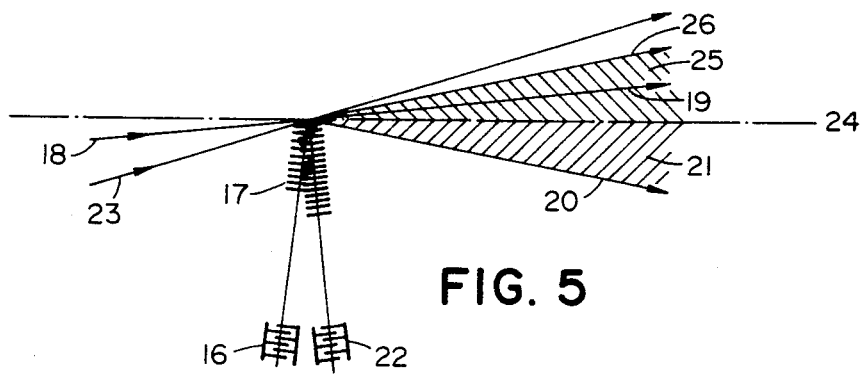
FIG. 5 is a diagram for explanation of the conventional deflecting method.
Figure 6A:
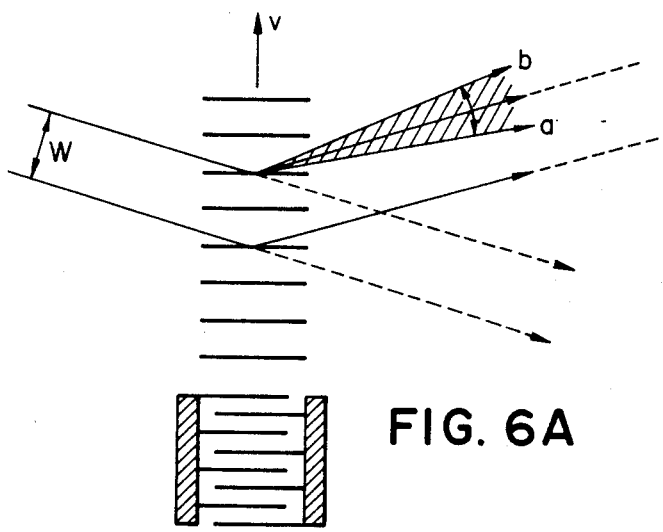
FIGS. 6A and 6B are diagrams for explaining the conventional repetitive scanning.
Figure 6B:
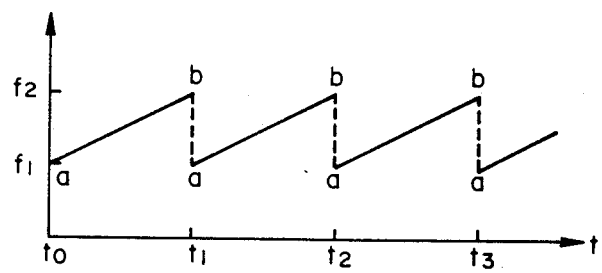

Next, the incident light beam is changed over to the second light beam 33 by the light beam change-over means at a time instant $(t_1 + \tau_2)$. While a voltage of a frequency $f_2$ is applied to the second electrode 30 at a time instant $t_1$, the supersonic wave 38 corresponding to this frequency reaches the point P at this time instant $(t_1 + \tau_2)$. Accordingly, the second light beam 33 is deflected simultaneously with the light beam change-over as shown in FIG. 8B in the direction b which is the maximum diffraction direction by this supersonic wave 38. The incident direction of this second light beam 33 has a directional component opposite to the travelling direction of the elastic surface wave relative to the second lattice line 38, which is different from the relationship between the first light beam 32 and the lattice line 37 as shown in FIGS. 8A, 8B. Owing to such construction, the second light beam is deflected in the direction to be away from the zero order light position e of the first light beam 32 in correspondence to the frequency change of from $f_2$ to $f_1$, to be explained below, whereby the bright line noise due to the zero order light as shown in FIG. 5 is eliminated without inclusion of the zero order light in the respective first and second deflecting angle ranges. As shown in FIG. 9B, the signal to be applied to the second electrode lowers its frequency from $f_2$ to $f_1$ during the time period of $t_1$ to $t_2$. Accordingly, the second light beam 32 entering from a negative direction of the elastic surface wave as shown in FIG. 8B is subjected to the deflection so as to be closer to the zero order light position d from the maximum diffraction angle position c. In this embodiment, since the light incident directions and their positions are so established that the diffracting direction of the first light beam 32 by the first transducer (the direction b in FIG. 8) may be coincident with the diffracting direction of the second light beam 33 by the second transducer at a frequency changing point $f_2$, the first deflected light beam and the second deflected light beam are joined together at a time instant $(t_1 + \tau)$, and the second light beam 33 is continuously deflected from its maximum diffraction angle position b to the minimum diffraction angle position c during a time period of from $(t_1 + \tau_2)$ to $(t_2 + \tau_2 - \tau_W)$. As the consequence, the light beam continuously scans an angular range of deflection twice as large as the conventional one, i.e., $2\widehat{(H)}$, from the maximum diffraction angle position a to the minimum diffraction angle position c during a time period of from $(t_0 + \tau_1)$ to $(t_2 + \tau_2 - \tau_W)$, as shown in FIGS. 8A, 8B, and FIG. 9E.

FIGS. 9C, 9D indicate changes in intensity of the first and second deflected light beams, and FIG. 9E indicates changes in the angle of diffraction of the deflected light beam as measured from the reference position g. Further, at a time instant $t_2 + \tau_1$, when the incident light beam is again changed over to the first light beam from the second light beam, the deflected light beam flies back to the initial scanning start point a, and thereafter the raster scanning between the points a and c becomes possible by the same periodical change-over driving.

In this embodiment, the applied signal is changed over to the respective transducers in conjunction with the change-over of the incident light beams. In practice, however, there is no possibility of coupling to take place between the first light beam and the second elastic surface wave as well as the second light beam and the first elastic surface wave, because they are far away from the Bragg's conditions. Therefore, even if the same signal is applied to both transducers for the simultaneous driving, there can be performed the deflection as shown in FIGS. 8A, 8B.

As explained in the foregoing, the beam deflecting device of this embodiment is so constructed that two light beams are projected into the supersonic wave field to be deflected in mutually opposite directions with respect to changes in the frequency imparted to the transducers, that a frequency band to be imparted to the transducers is so set as to deflect the two incident light beams in a mutually different angular range, and that, by alternately changing over the two light beams the zero order light beam is prevented from mixing into the angular range of deflection. Therefore, the beam deflection can be done in a wide range of angles.

Figure 10:
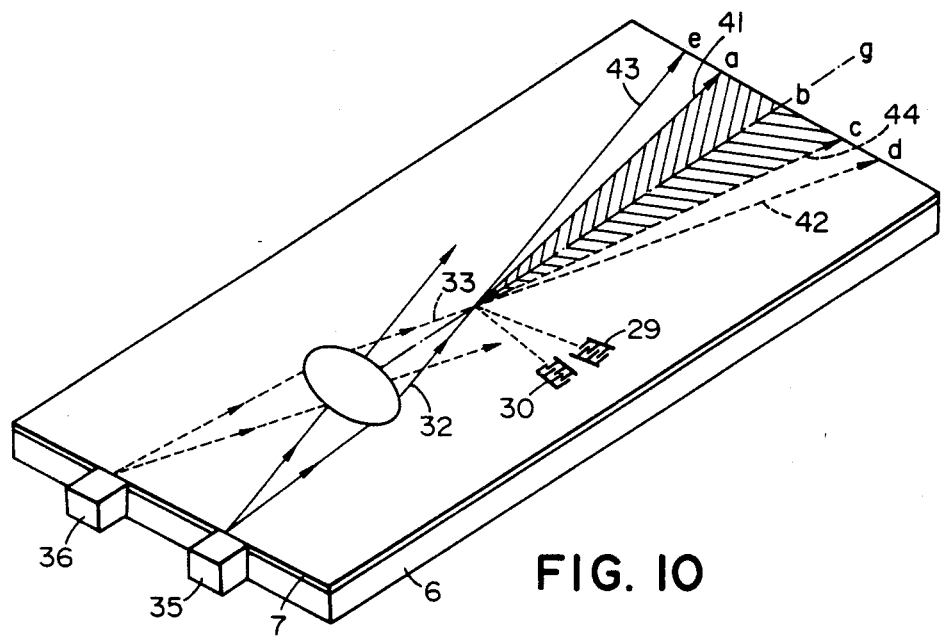
FIG. 10 is a perspective view showing more details of the beam deflecting device shown in FIG. 7.

FIG. 10 illustrates an overall perspective view of the beam deflecting device of the first embodiment of the present invention, wherein two semiconductor lasers 35, 36 are disposed on the incident end surface of the optical waveguide 7, from which light beams travel to the supersonic wave field through a thin film lens, and are diffracted. In order to diffract the incident light beams from these two directions, two sets of electrodes 29, 30 are disposed at a predetermined inclined angle so as to couple the two light beams, and are so arranged as to cause the electrode patterns to be symmetrical with each other. When the first light beam 32 from the first semiconductor laser 35 is projected to the corresponding first electrode 29, the light beam is coupled by the first supersonic diffraction lattice, and the deflected light beam 41 is obtained, while a part of the incident light beam which has not been diffracted becomes the zero order light beam 43. In the same manner, when the second light beam 33 from the second laser 36 is projected to the corresponding second electrode 30, the incident light beam is coupled and the deflected light beam 44 is obtained, while undiffracted light beam becomes the zero order light beam 42. Further, according to the present embodiment, since an incident angle of the two incident light beams is so set that the maximum and minimum diffraction directions of each of the light beams may be coincident at a changing point of the frequency, there can be obtained the deflecting device having a doubled angle of deflection, wherein the deflecting ranges of both light beams are contiguous.

Figure 11:
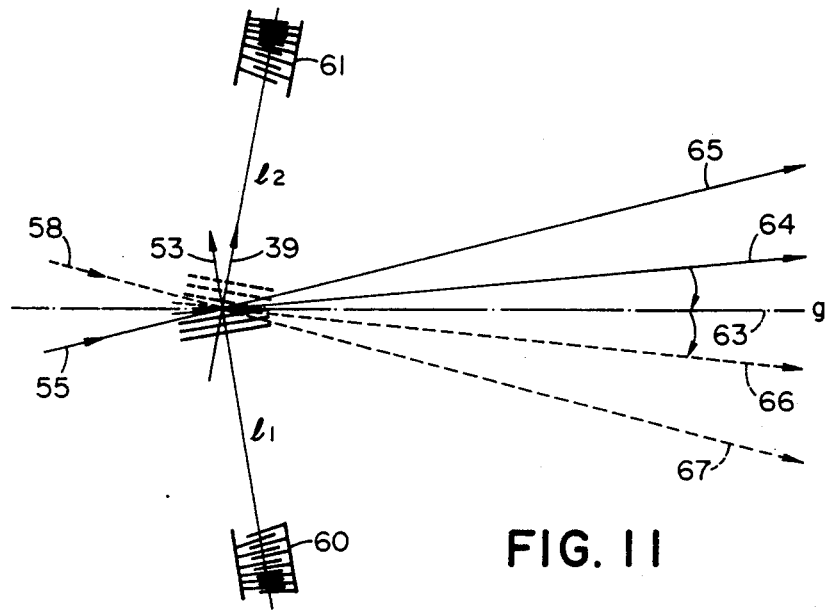
FIGS. 11, 12A to 12C, and 13 are respectively a plan view of another embodiment of the deflecting device of the present invention with an angle of deflection being widened, time charts of a frequency signal in this device, and a plan view of a recording tape when it is used with the deflecting device.

Besides the abovementioned arrangement of the transducers, the present invention makes it possible to dispose two transducers 60, 61 symmetrically to the reference line g, as shown in FIG. 11. In this arrangement, it is desirable that distances $l_1$, $l_2$ of the two transducers to the center of the light beams have a difference $(l_1-l_2)$ equal to the width of the light beam.

Figure 12:
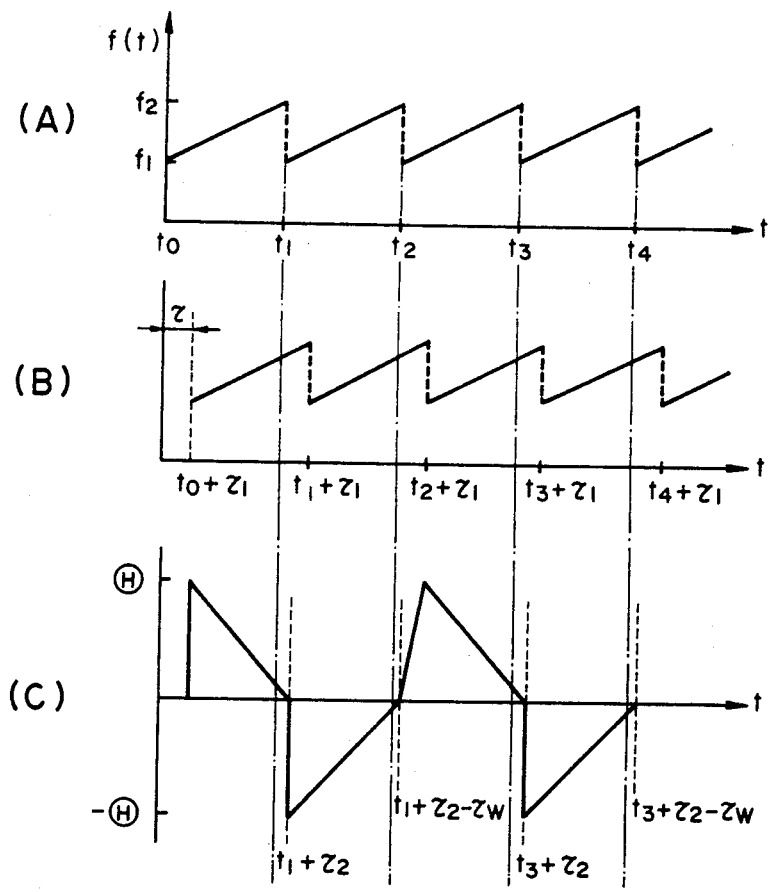
Figure 13:
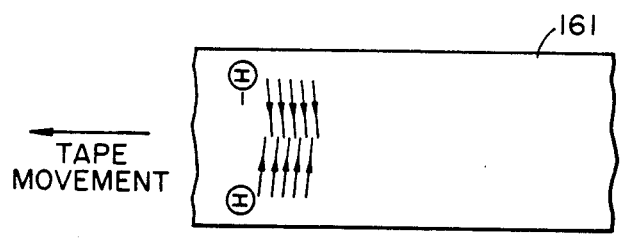

Further, in the present invention, the transducers are driven by a reciprocally vibrating chirped signal. In case, however, increase in the deflecting angle is the sole purpose, an ordinary chirped signal as shown in FIG. 12A may serve the purpose, although, in this case, the deflecting angle becomes discontinuous in the direction of the reference line g as shown in FIG. 12C. When the tape recording of the signal is done using this deflector, the light beam scan on the surface of the tape 161 is shown in FIG. 13.

Figure 14:
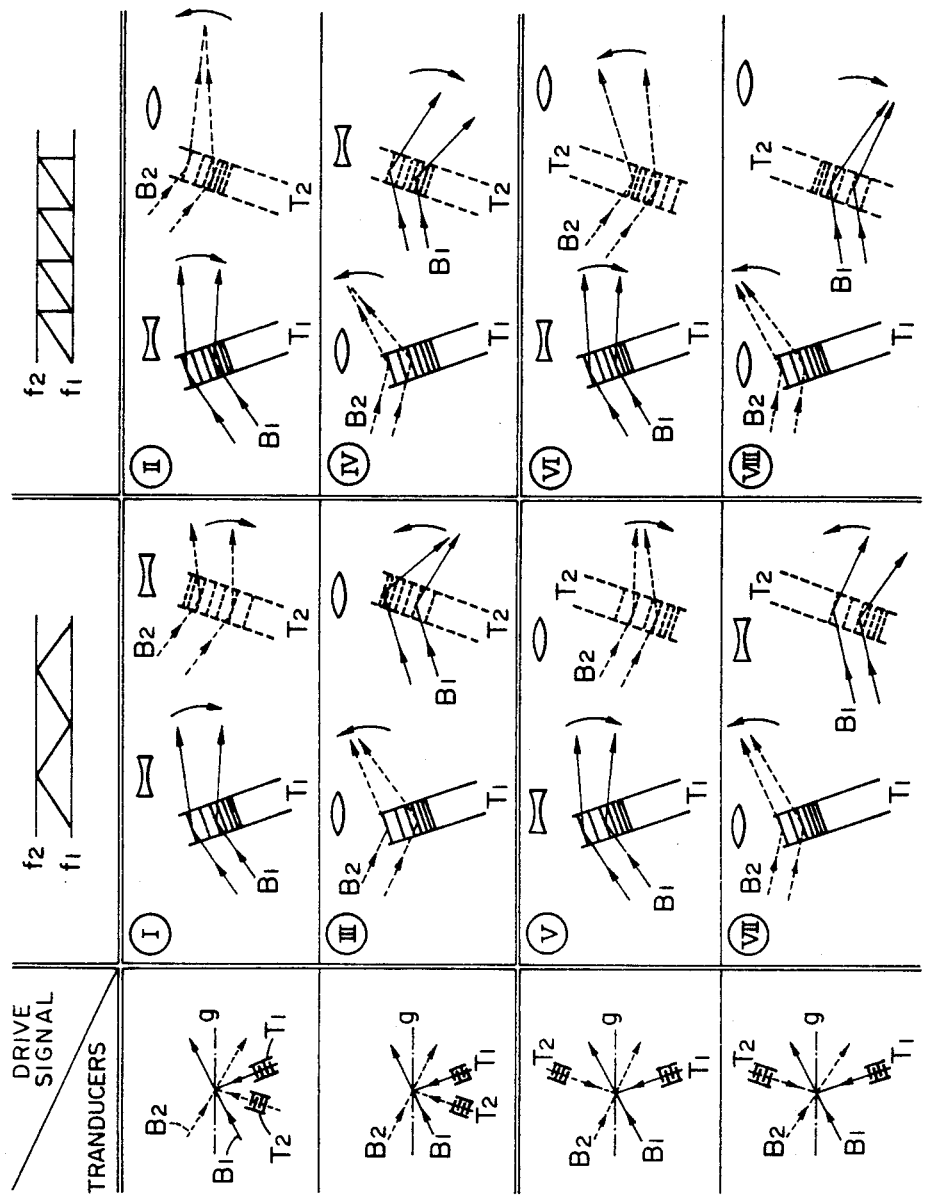
FIG. 14 shows various combinations of the signal waveforms and the transducer arrangements for widening the angle of deflection.

As in the above-described embodiment, the present invention contemplates a total of eight kinds of combinations of the transducer arrangements and the drive signals, as shown in FIG. 14, i.e., (1) the transducers are disposed on the same side of the reference line g; (2) they are disposed in a symmetrical relationship with the reference line g; (3) a drive chirped signal of the transducers is reciprocally vibrated; and (4) the chirped signal is uni-directionally vibrated. In addition, there may be contemplated combinations of two light beams projecting symmetrically with the reference line and the transducers. (cf. C. S. Tsai's article as referred to in the foregoing). FIG. 14 indicates the deflecting direction of the deflected light beam and the lens function by the chirped signal in each case of these combinations. It should be noted particularly that, when effecting the beam deflection in high resolution, if the lens function varies from "concave" to "convex", or vice versa, due to the two transducers, off-focus would occur unfavorably. From the illustrations in FIG. 14, the combinations (I), (III), (VI) and (VIII) do not bring about the off-focus. Also, the combinations (I), (III), (V) and (VII) cause the deflecting direction to be continuous in one and the same direction. Accordingly, the cases wherein the light beams are continuously scanned without the off-focus are limited to the combinations (I) and (III).

Figure 15:
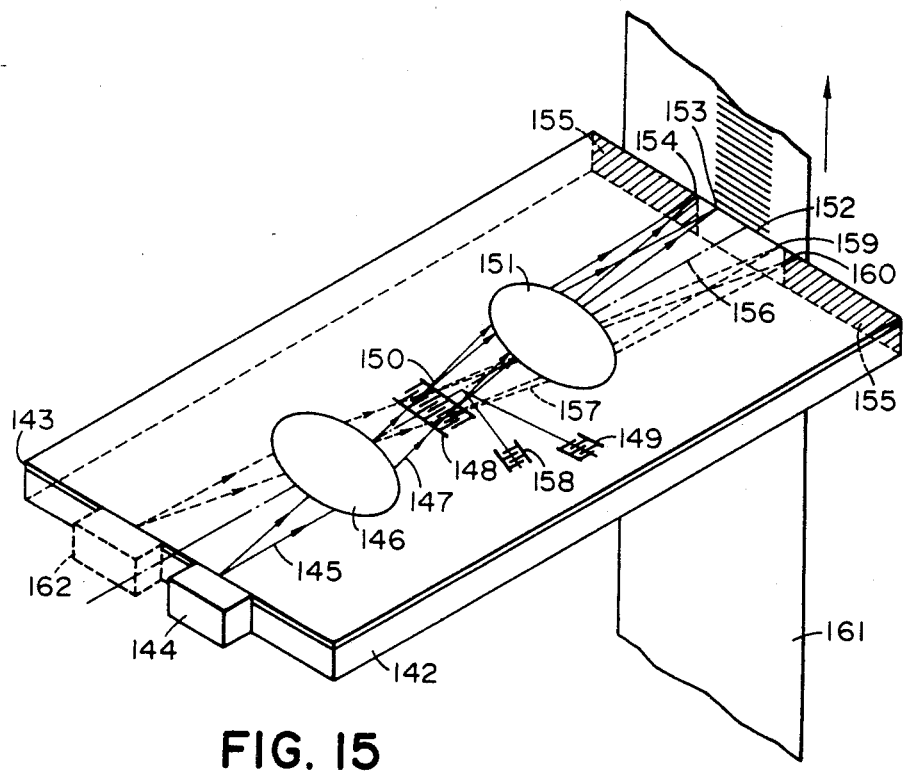
FIG. 15 is a perspective view of a recording device combined with the beam deflecting device having a large angle of deflection.

Referring now to FIG. 15, explanations will be given as to an embodiment, wherein a thin film image forming lens is combined with the A/O deflector having a doubled deflecting angle into a bright point scanner which is utilized as a recording head for a video signal.

A semiconductor laser 144 is directly contacted to the optical waveguide 143 manufactured by diffusing titanium into the substrate 142 of $LiNbO_3$, and the laser beam is coupled in the optical waveguide. The coupled laser beam 145 propagates through the waveguide 143, during which it is rendered a collimated beam 147 by the thin film lens 146. The collimated beam 147 passes through the comb-shaped electrode 148 disposed on the surface of the thin film optical waveguide 143. The transmitted beam 150 is then deflected by the supersonic elastic surface wave excited by the electrode 149, and converged on the end surface 152 of the substrate 142 as a spot image 153 by the action of the image forming lens 151. In this case, the lens 151 has no image forming function in the direction perpendicular to the optical waveguide 143, hence the spot size in this direction becomes substantially equal to the thickness of the waveguide.

In this embodiment, thickness of the waveguide is approximately 2 micro-meters or so. The zero order light which has not been diffracted by the supersonic elastic surface wave converges as a spot image 154. A light intercepting member 155 is provided in the vicinity of this light converging point.

Then, the drive frequency of the supersonic wave transducer 149 is continuously changed from a low frequency $f_1$ to the maximum frequency $f_2$ so as to scan the bright point 153 up to a position of the optical axis 156. In this state, a constant voltage is applied to the comb-shaped electrode 148 for light beam change-over to cause the direction of the incident light beam 147 to change. The thus changed-over beam 157 is coupled with the elastic surface wave excited by the supersonic wave transducer 158 owing to change in the direcion of the beam, and is converged on the end face 152 of the crystal substrate 142 as a spot image 159 with its direction changed. The un-diffracted light is focused as a spot image 160, and is absorbed by the light intercepting member 155.

By changing the drive frequency imparted to the supersonic wave transducer 158 from $f_2$ to $f_1$, a spot image which has been scanned up to the optical axis 156 shifts to the position of the spot image 159.

Next, by interrupting the voltage to the light beam change-over electrode 148, the incident light beam 147 passes through the electrode 148, and is coupled with the surface wave to be excited by the supersonic wave transducer 149, and returns to the previous image forming point 153. Thereafter, the same steps are repeated to perform the bright spot scanning. Therefore, a high speed scanning and recording can be done by contacting the recording tape 161 such as a photomagnetic recording member, etc. with this crystal end face 152, while shifting the tape in an arrow direction, and modulating the current from the semiconductor laser with an image signal. For example, a field recording of a television image can be done by introducing an input video signal such as NTSC, etc., causing 1H of the TV field to correspond to this video signal at the time of one scanning, and taking the repetition frequency of the bright spot scanning at 15.7 KHz.

In this particular embodiment, the light beam is changed over by the comb-shaped electrode 148. It is also possible to project the light beams from two directions into the diffraction lattice part of the elastic surface wave by providing the second semiconductor laser 162 shown in dot lines in FIG. 15 and by alternate change-over of the light beam with the first and second semiconductor lasers 144, 162. In this case, the comb-shaped electrode 148 becomes unnecessary. Since, in the present embodiment, a wide angle recording can be done continuously, the recorded image surface can be directly observed when the TV signals, etc. are recorded, because the signal is recorded in the same pattern as the TV screen, which is advantageous.

Figure 16:
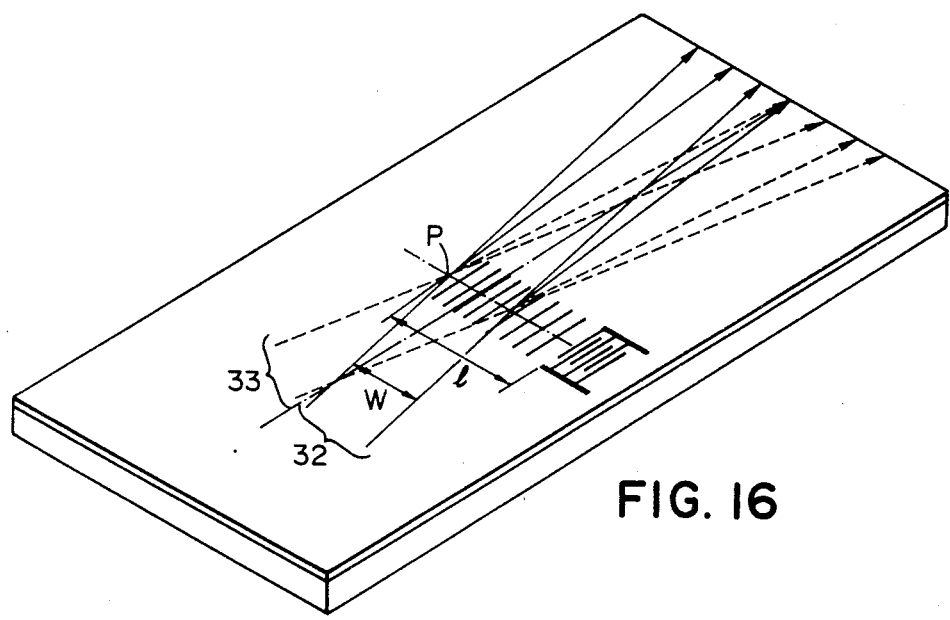
FIG. 16 is a perspective view of a beam deflecting device having a single transducer and a large angle of deflection.

Furthermore, in case the scanning range needs not be continuous, e.g., when the scanning and recording are to be done simultaneously on two tracks which are spaced apart from each other, the incident direction of the two incident light beams is set in both positive and negative directions with a single transducer as shown in FIG. 16. In this embodiment, since the inclination of the lattice vector cannot be changed in correspondence to change-over of the incident light beams, the diffracting angles of the two light beams at a particular frequency cannot be made identical, although the scanning region containing a blank region in its intermediate position can be continuously scanned time-sequentially with the fly-back time being substantially zero.

Figure 1:
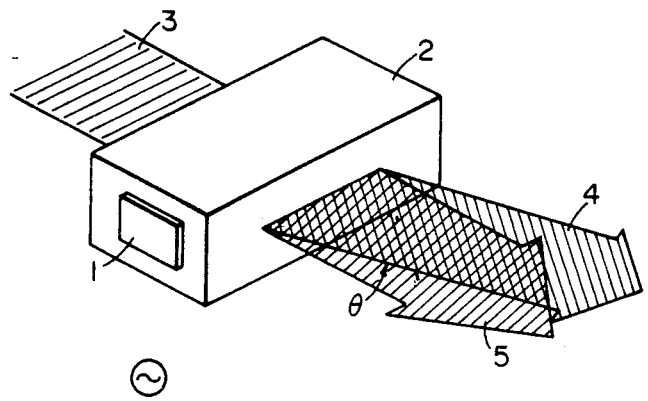
FIGS. 1 and 2 are schematic perspective views of conventional A/O deflectors.
Figure 2:
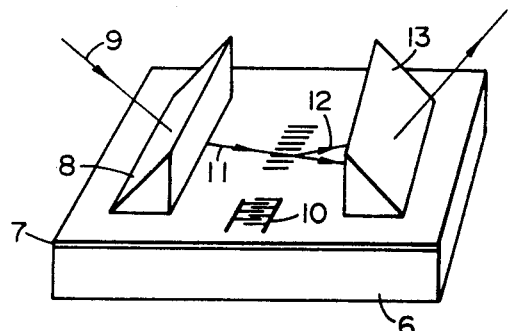
Figure 3:
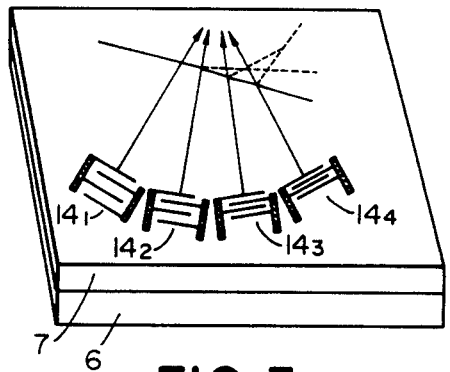
FIGS. 3 and 4 are a schematic perspective view as well as a schematic plan view of conventional wideband transducers.
Figure 4:
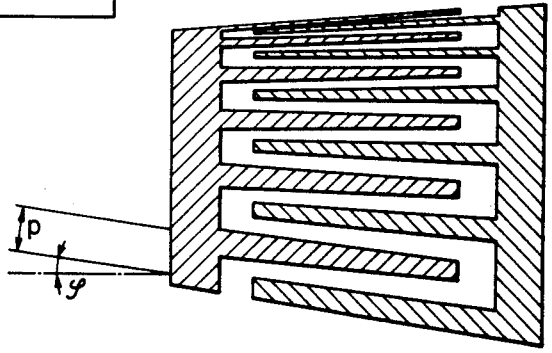

In the above-described embodiment, the first and second transducers may be substituted for one as shown in FIG. 3 which is constructed with a plurality of electrodes. For instance, the transducer of FIG. 3 composed of four electrodes shares the frequency region of from $f_1$ to $f_2$ in FIG. 9 as the first and second transducers. Accordingly, use of the present embodiment makes it possible to obtain a wide deflecting range with a doubled angle.

As is apparent from the foregoing explanations, the beam deflecting device according to the present invention is so designed that the incident light beams may be changed-over in correspondence to the frequency changes with respect to the supersonic wave field generated by the transducer section consisting of a set or a pair of transducers, thereby providing a wide range of the deflecting angle without doubling the signal band to be applied to the transducer section. Moreover, no noise beam due to the zero order light is mixed into the deflecting angle range, so that the beam deflecting device according to the present invention is highly efficient in its operation.

In the following, some embodimental data for the TV image recording will be given.

| | |
|---|---|
| 1. Tape width: | ¼ inch |
| 2. Recording material: | amorphous GdCo (or GdTbFe) |
| 3. Semiconductor laser: | 820 mm in wavelength; single mode oscillation |
| 4. Focal length of lenses 46, 51: | 28.6 mm |
| 5. Diameter of light beam 47: | 4.5 mm |
| 6. Thickness of optical waveguide: | 2 micro-meters |
| 7. Size of spot image: | 2 μm in length × 3 μm in width |
| 8. Scanning angle of single transducer: | 3 degrees (total scanning angle of two transducers being 6 degrees) |
| 9. Total scanning width: | 3 mm |
| 10. Drive frequency band of transducer: | 500 MHz to 1,000 MHz |
| 11. Thin film lens: | geodesic lens |
| 12. Absorbing material 55, | halogen or metal such as titanium in thin film form |
| 13. Incident angle of incident light beams 50, 57 with respect to the optical axis: | 6.11 degrees |

In the following, explanations will be given as to an embodiment of the beam deflecting device of the present invention, wherein the fly-back time for returning the deflected light beam from the final point to the initial point in the angular range of deflection is made substantially zero.

Figure 17:
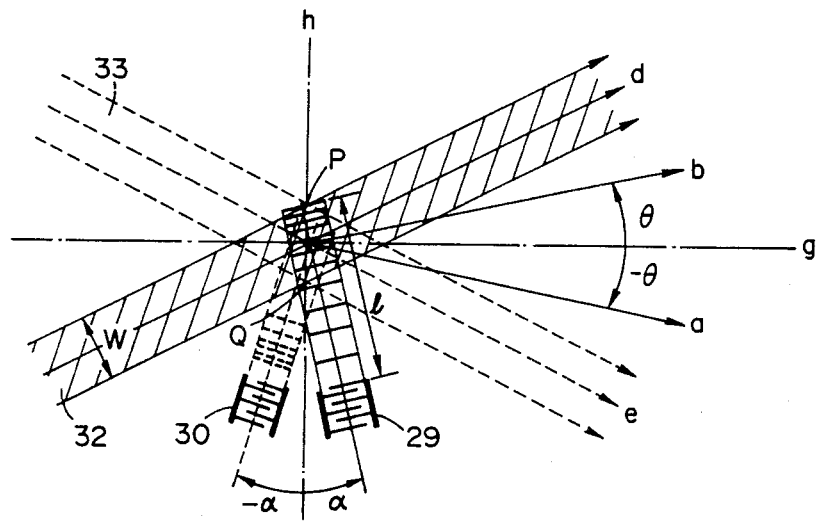
FIG. 17 is a partially enlarged plan view of the beam deflecting device, in which the fly-back time is substantially zero.

FIG. 17 illustrates a plan view of the deflecting section of the beam deflecting device, and FIGS. 18A to 18H are time charts of the drive signal frequency to be applied to the transducers. In this deflecting device, a pair of comb-shaped electrodes 29, 30 are disposed on the surface of the optical waveguide at an angle $2\alpha$. An axis h perpendicular to the axis of symmetry g for the first incident light beam 32 and the second incident light beam 33 constitutes an axis of symmetry for the first electrode 29 and the second electrode 30. These two electrodes are away from the corresponding light beams at an equal distance. A distance from the end P of the light beam to the electrode is denoted by l.

In the beam deflecting device according to the present invention, signal voltages which reciprocally change within the frequency range of $f_1$ and $f_2$ as shown in FIGS. 18A and 18B are alternately applied to the comb-shaped electrodes 29, 30. That is, a signal voltage with its frequency changing continuously from $f_2$ to $f_1$ during a time period of from $t_1$ to $t_2$ is applied to the electrode 29, while a signal voltage with its frequency continuously changing from $f_1$ to $f_2$ during a time period of from $t_1'$ to $t_2'$ is applied to the electrode 30. By this high frequency signal application, the supersonic elastic surface wave is generated on the surface of the optical waveguide 21, which travels at a speed of V mm/sec. Here, the starting time $t_1'$ of the signal to be applied to the electrode 30 precedes the terminating point $t_2$ of the signal applied to the first electrode 29 by a time instant of $\tau_W$ required for the supersonic elastic surface wave to cross the light beam width W ($\tau_W = W/V$). Between $t_1$ and $t_2$, wherein the frequency initially changes from the frequency $f_2$ to the frequency $f_1$, the first light beam 32 of a width W is projected into the supersonic wave field of the elastic surface wave on the optical waveguide, which has been generated from the first electrode 29 by this signal. The supersonic elastic surface waves from the electrodes reach the end point P of this light beam which is at a distance l from the electrode 29 and the point Q at a distance of (1−W) at their respective time lags of $\tau_l = 1/V$ sec. and $(\tau_l - \tau_W)$ sec.

Assume now the frequency of a voltage to be applied to the electrode 29 at the time instant t is f(t). The diffraction lattice constants $N_P(t)$ and $N_Q(t)$ (a reciprocal of the lattice interval, i.e., a reciprocal of the wavelength of the elastic wave) are given by $$N_P(t) = \frac{f(t - \tau_l)}{V} \text{ and } N_Q(t) = \frac{f(t - \tau_l + \tau_W)}{V},$$

and the frequency varies as shown in FIGS. 18C and 18D. Accordingly, during the time period of from $(t_1 + \tau_l)$ to $(t_2 + \tau_l - \tau_W)$, the first light beam 32 is deflected from the maximum diffraction angle position a to the minimum diffraction angle position b, as shown in FIG. 17. Here, the time instant $(t_1+\tau_l)$ is of such a nature that the lattice constant $N_P$ assumes the maximum value $N_2$ at the point P, and the time instant $(t_2+\tau_l-\tau_W)$ is of such a nature that the lattice constant $N_Q$ assumes the minimum value $N_1$ at the point Q. The travelling direction of the supersonic wave excited by the second electrode 30 is symmetrical with that of the second light beam with respect to the axis h. At the time instant $(t_2+\tau_l-\tau_W)$, the incident light beam is changed over to the second light beam 33 by a light beam change-over means (not shown). Since the second electrode 30 is applied with a signal at a time instant $t_1'$ which precedes the time instant $t_2$ by $\tau_W$ as shown in FIG. 18B, the lattice constant $N_P$ reaches the minimum value $N_1$ at the point P as shown in FIG. 18C. Accordingly, the light beam 33 as changed over is diffracted instantaneously by the second supersonic wave. The incident direction of this second light beam 33 is so set that it may be symmetrical with the first light beam 32 with respect to the axis g. In this consequence, the second light beam 33 which has been changed over at the time instant $(t_2+\tau_l-\tau_W)$ is diffracted in the direction a. As shown in FIG. 17, this diffracted light is deflected from the minimum diffraction angle position a to the maximum diffraction angle position b as shown in FIG. 18G during the time period of from $t_1'$ to $t_2'$.

At the time instant $(t_3+\tau_l)$, the incident light beam is again changed over from the second light beam 33 to the first light beam 32. This time instant $t_3$ precedes the time instant $t_2'$ by $\tau_W$. At this instant, the projecting light beam instantaneously flies back from the position b to the position a. Thereafter, by periodically changing over the incident light beams in the same manner as mentioned above, the raster scanning between the positions a and b becomes feasible.

The fly-back time of the scanning light beam in this embodiment is substantially equal to the change-over time for the two light beams, which time is approximately 3 nsec. by the ordinary light beam change-over technique in the optical waveguide (vide, for example, "Applied Physics Letter", Vol. 24, No. 11 (1974) by J. M. Hammer et al.).

As is apparent from the foregoing explanations, the beam deflecting device of this invention is so constructed that a signal which reciprocally changes in a predetermined range of frequency is applied to the two transducers, and two incident light beams are changed over in correspondence to this reciprocal changes in the signal frequency, whereby the deflection and scanning of the light beams can be done repetitively without occurrence of the fly-back time to a substantial degree.

Although, in this embodiment, a chirped signal with its frequency changing from $f_2$ to $f_1$ is applied to one of the transducers and another chirped signal with its frequency changing in the opposite direction, i.e., from $f_1$ to $f_2$, is applied to the other transducer, the present invention is practicable with chirped signals, the frequency of which changes in one and the same direction. In this case, however, the light beam deflecting direction by the two transducers becomes mutually opposite. In consequence of this, it becomes necessary that the information signal inputs be introduced in opposite direction at every one scan line.

Figure 19:
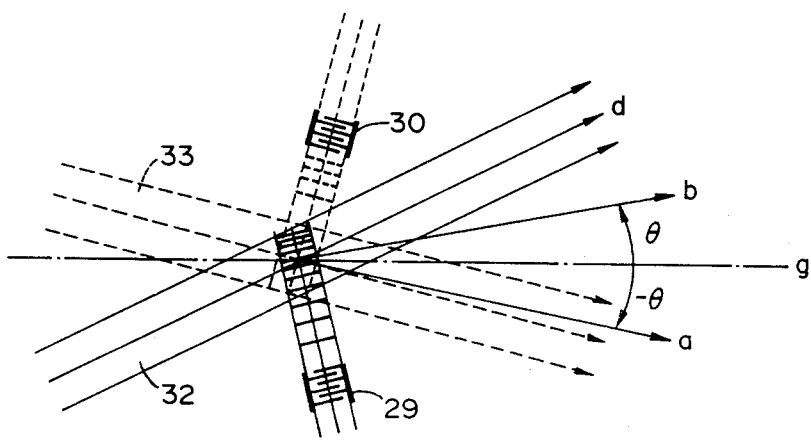
FIG. 19 is a partially enlarged plan view of the beam deflecting device, in which the transducers are disposed in mutually opposite directions.

The two transducers may be disposed mutually symmetrically with respect to the reference line g as shown in FIG. 19.

Figure 18:
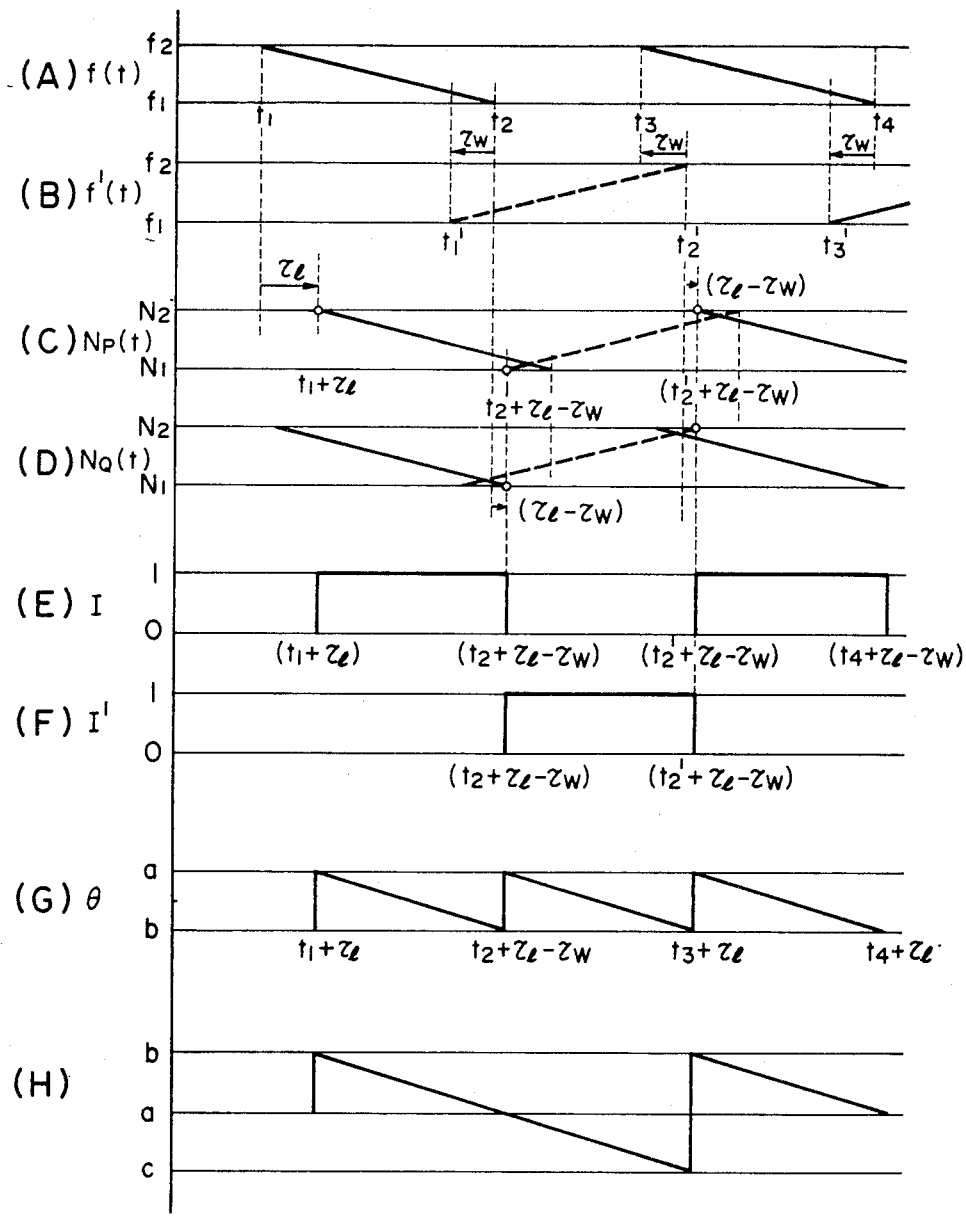
FIGS. 18A to 18H are time charts of a signal to be applied to the transducers of the deflecting device in FIG. 17.
Figure 20:
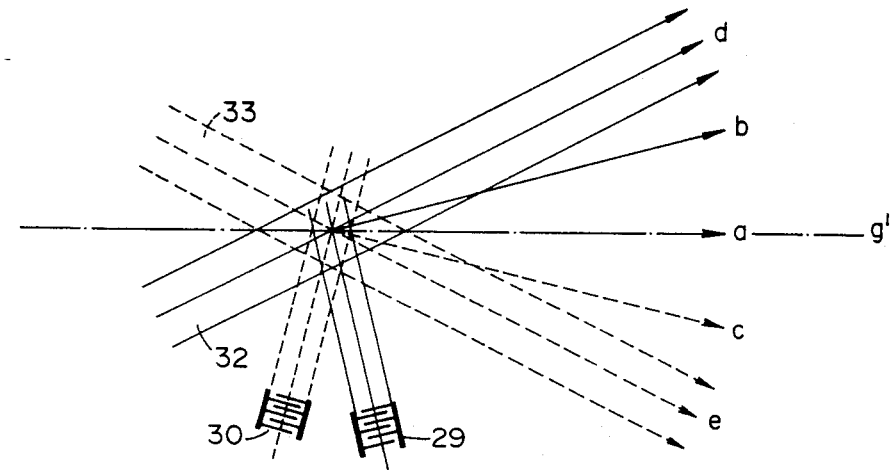
FIG. 20 is a partially enlarged view of the beam deflecting device having a large angle of deflection and in which the fly-back time is substantially zero.

Still another embodiment of the beam deflecting device will be explained in reference to FIG. 20. In this embodiment, the reference line g' is taken in the direction of the maximum deflecting angle a by the first transducer 29. The second transducer 30 is disposed in a direction symmetrical with the first transducer 29 with respect to the second reference line h' which is perpendicular to the reference line g'. Further, the two incident light beams 32, 33 are in a direction mutually symmetrical with the reference line g'. With this arrangement, the change-over between the two transducers 29, 30 and the two light beams 32, 33 is effected by the driving method of FIG. 18 as referred to in the previous embodiment. In this embodiment, the first light beam 32 is deflected by the first transducer from the direction of the position a to the position b, as shown in FIG. 20, after which the second light beam 33 is deflected from the direction of the position c to the position a by the second transducer. Accordingly, by repeating these operations continuously, the light beam is continuously deflected in the direction of "c→a→b", "c→a→b", and so on, as shown in FIG. 18H. In this instance, the deflecting angle can be made twice as large as that in the case of using a single transducer.

Figure 21:
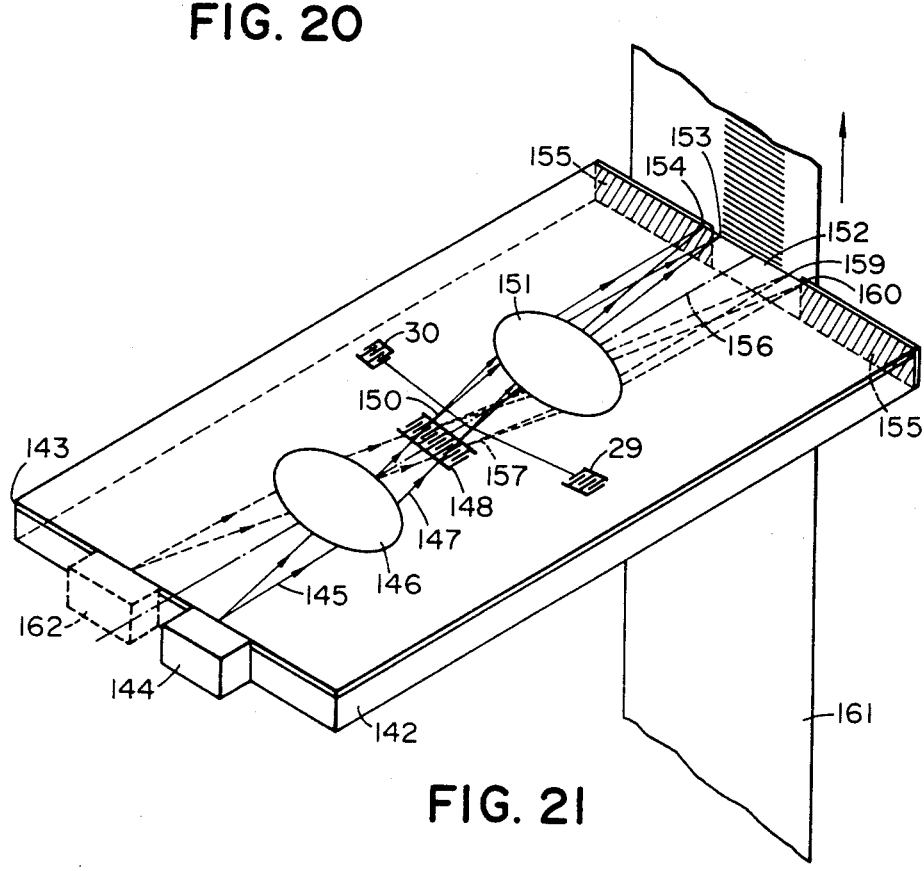
FIG. 21 is a schematic perspective view of a recording device combined with the beam deflecting device shown in FIG. 19.

FIG. 21 shows a further embodiment of the present invention, wherein a thin film image forming lens is combined with the A/O deflector adopting the electrode arrangement of FIG. 19 into a bright point scanner, and the thus constructed element is used for a recording head of a video signal. In this construction, the constituent members are exactly the same as those shown in FIG. 15.

As explained so far, the beam deflecting device of the present invention in various preferred embodiments is provided with a transducer section consisting of a pair of transducers, with which the incident light beams are changed over in correspondence to reciprocation of the signal frequency, thereby enabling the light beams to be deflected in a wide angular range and with the fly-back time being substantially nil. Therefore, the beam deflecting device of the present invention is highly favorable for high speed scanning.

What I claim is:

1. Beam deflecting device, comprising:
   (a) an optical waveguide;
   (b) transducing means for generating an acoustic wave in said waveguide;
   (c) means for intersecting a first and a second light beam with said acoustic wave from mutually different directions, and diffracting said light beams;
   (d) driving means for driving said transducing means; and
   (e) means for effecting change-over between said first light beam and said second light beam.

2. Beam deflecting device, comprising:
   (a) an optical waveguide;
   (b) first transducer for generating a first acoustic wave in said waveguide;
   (c) second transducer for generating a second acoustic wave in said waveguide, wherein a travelling direction of said first acoustic wave and a travelling direction of said second acoustic wave form a finite angle;
   (d) means for intersecting a first and a second light beam with said first and second acoustic waves, respectively, from mutually different directions, and diffracting said first and second light beams; and (e) driving means for driving said first and second transducers, said means applying a signal which varies in one and a same frequency band to each of said first and second transducers.

3. Beam deflecting device according to claim 2, wherein said driving means alternately applies a signal with its frequency changing from $f_1$ to $f_2$ to said first transducer and a signal with its frequency changing from $f_2$ to $f_1$ to said second transducer, and each of said signals is applied to each of said transducers in advance of a time required for said acoustic waves to cross a width W of said first and second light beams.

4. Beam deflecting device according to claim 2 or 3, wherein said first and second transducers are positioned in such a manner that a direction of said first beam which has been diffracted by said first acoustic wave at the largest angle of diffraction may be coincident with a direction of said second beam which has been diffracted by said second acoustic wave at the largest angle of diffraction.

5. Beam deflecting device, comprising:
(a) an optical waveguide;
(b) a first transducer for generating a first acoustic wave in said waveguide;
(c) a second transducer for generating a second acoustic wave in said waveguide, wherein a travelling direction of said first acoustic wave and a travelling direction of said second acoustic wave form a finite angle;
(d) means for intersecting a first and a second light beam with said first and second acoustic waves, respectively, from mutually different directions, said means diffracting said first and second light beams to within a range defined by said different directions; and
(e) driving means for driving said first and second transducers, said driving means applying, respectively to said first and second transducers, signals which vary in respective predetermined frequency bands.

6. Beam deflecting device according to claim 5, wherein said driving means alternately applies a signal with its frequency changing from $f_1$ to $f_2$ to said first transducer and a signal with its frequency changing from $f_2$ to $f_1$ to said second transducer, and each of said signals is applied to each of said transducers in advance of a time required for said acoustic waves to cross a width W of said first and second light beams.

7. Beam deflecting device according to claim 5 or 6, wherein said first and second transducers are positioned in such a manner that a direction of said first beam which has been diffracted by said first acoustic wave at the largest angle of diffraction may be coincident with a direction of said second beam which has been diffracted by said second acoustic wave at the largest angle of diffraction.

* * * * *